United States Patent [19]

Garmire et al.

[11] Patent Number: 5,643,476
[45] Date of Patent: Jul. 1, 1997

[54] LASER SYSTEM FOR REMOVAL OF GRAFFITI

[75] Inventors: Elsa Garmire, Manhattan Beach; Katherine X. Liu, Los Angeles; Robert Russell, Manhattan Beach, all of Calif.

[73] Assignee: University of Southern California, Los Angeles, Calif.

[21] Appl. No.: 310,676

[22] Filed: Sep. 21, 1994

[51] Int. Cl.[6] .................................................. B23K 26/04
[52] U.S. Cl. .................. 219/121.68; 219/121.76; 219/121.81; 219/121.83
[58] Field of Search ............... 219/121.6, 121.61, 219/121.62, 121.68, 121.69, 121.7, 121.76, 121.81, 121.82, 121.83, 121.85; 216/4, 65; 134/1; 264/400, 482; 364/474.08

[56] References Cited

U.S. PATENT DOCUMENTS

| Re. 33,777 | 12/1991 | Woodroffe | 134/1 |
|---|---|---|---|
| 4,148,057 | 4/1979 | Jesse | 347/232 |
| 4,584,455 | 4/1986 | Tomizawa | 219/121.68 |
| 4,588,885 | 5/1986 | Lovoi et al. | 219/121.62 |
| 4,665,377 | 5/1987 | Harpaintner | |
| 4,695,698 | 9/1987 | Mayor et al. | 219/121.6 |
| 4,756,765 | 7/1988 | Woodroffe | 134/1 |
| 4,844,947 | 7/1989 | Kasner et al. | |
| 4,859,075 | 8/1989 | Sutter, Jr. et al. | 219/121.61 |
| 4,880,959 | 11/1989 | Baum et al. | 219/121.85 |
| 4,900,891 | 2/1990 | Vega et al. | 219/121.6 |
| 4,986,664 | 1/1991 | Lovoi | 219/121.68 |
| 5,040,479 | 8/1991 | Trash | |
| 5,194,723 | 3/1993 | Cates et al. | |
| 5,281,798 | 1/1994 | Hamm et al. | |

FOREIGN PATENT DOCUMENTS

| 2661371 | 4/1990 | France. |
|---|---|---|
| 2-263584 | 10/1990 | Japan. |
| 2246099 | 1/1992 | United Kingdom. |
| WO8301400 | 4/1983 | WIPO. |

OTHER PUBLICATIONS

Laser Removal of Graffiti by Katherine Liu and Elsa Garmire, AHMCT Research Report, Sep. 22, 1993.
Elsa Garmire and Katherine Liu, *Summary of Research Effort – Laser Removal of Graffiti*, Jul. 26, 1993, pp. 1–16.

*Primary Examiner*—Teresa J. Walberg
*Assistant Examiner*—Gregory Mills
*Attorney, Agent, or Firm*—Small, Larkin & Kidde

[57] ABSTRACT

A laser system for the removal of graffiti from a retro-reflective highway sign or other surface includes a mobile crane adapted to support a laser scanner and an ablating laser under the control of a computer. An optical sensor and target indicator cooperate to function as a target acquisition device for identifying portions of a highway sign covered with graffiti. Responsive to the target acquisition device, the computer controls the laser scanner and laser to automatically ablate the graffiti covered portions of the highway sign to remove the graffiti. If needed, any remaining graffiti is manually brushed away and the highway sign is polished to restore the retro-reflective properties.

10 Claims, 8 Drawing Sheets

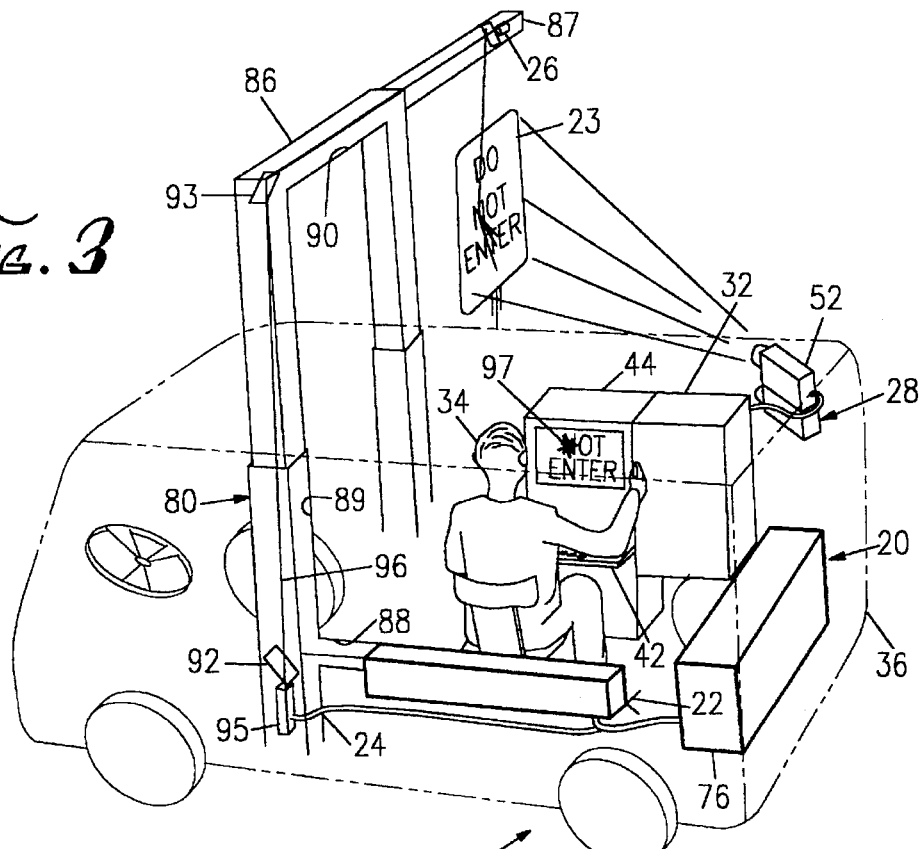
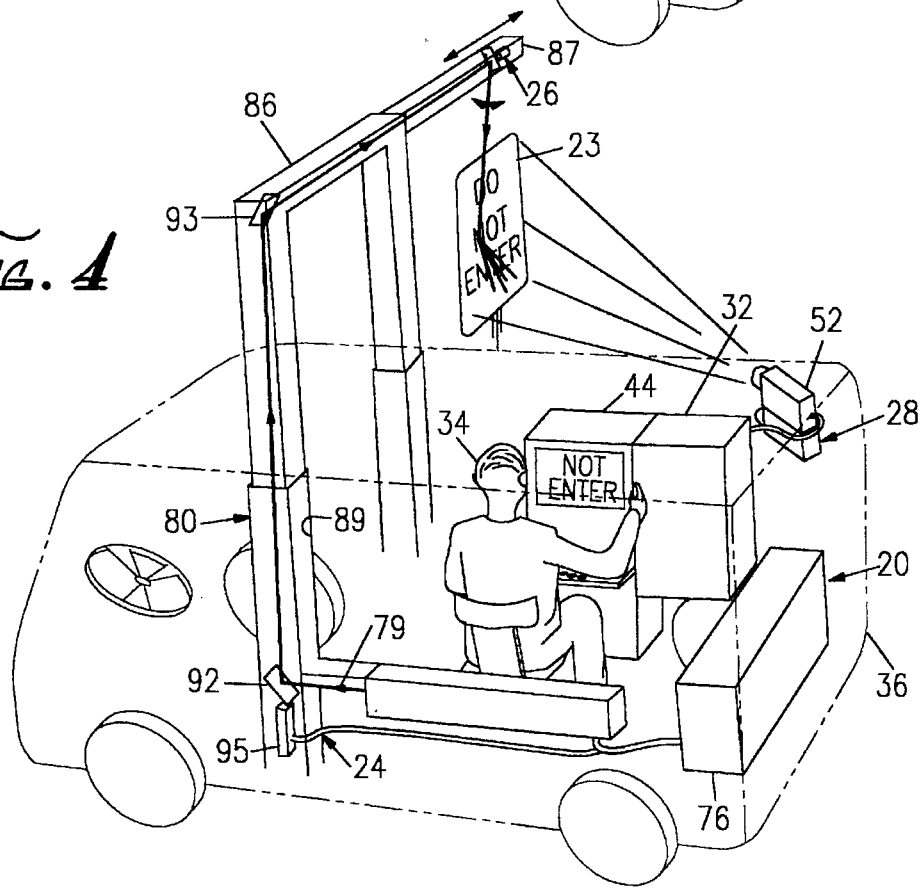

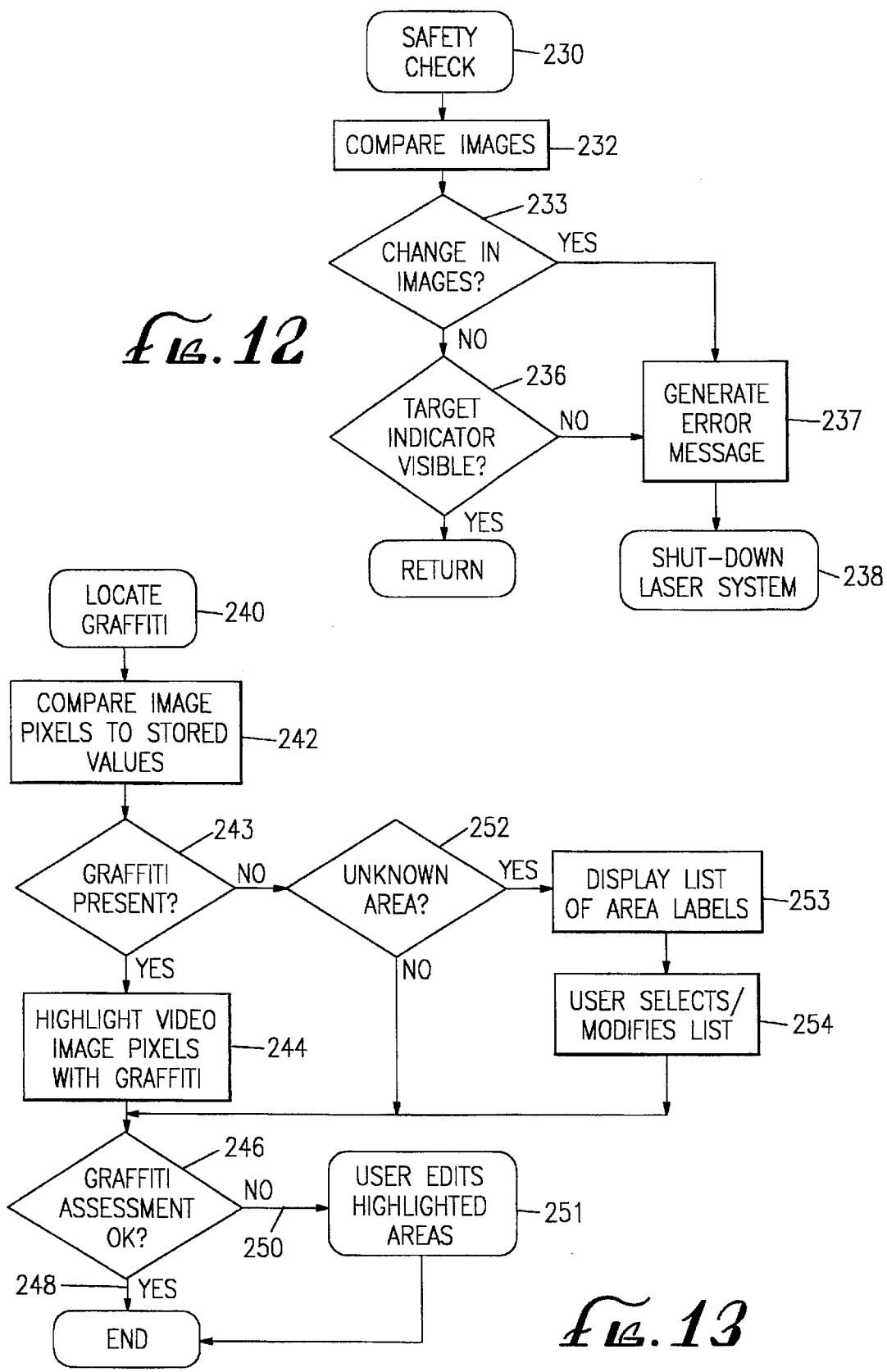

LASER SYSTEM FOR REMOVAL OF GRAFFITI

BACKGROUND OF THE INVENTION

The display of graffiti on highway and traffic signs has become a common occurrence in many metropolitan areas. Such displays are undesirable as the graffiti can often obscure vital highway and traffic information which may create hazardous conditions and, more importantly, slows down the flow of commerce. The clean-up of graffiti and unwanted paint is very costly, time-consuming and labor-intensive. Conventional ways of cleaning graffiti and other unwanted paint using chemicals or sand blasting are not satisfactory. Chemicals are environmentally unfriendly, may be dangerous to the health of the user, and require storage of large amounts of often dangerous materials. Sandblasting harms the surface, requires the storage of sand, and leaves a pile of sand afterwards. With the limited budgets available to city planners, the graffiti is often left on the highway signs. The motorist is then left to decipher the information underlying the graffiti to avoid getting lost. Periodically, the replacement of the vandalized signs becomes necessary but this solution can be expensive and cost prohibitive for many cities.

One particularly important application is "high intensity" highway signs. These are the "FREEWAY ENTRANCE", "DO NOT ENTER" and "ONE-WAY" signs at every freeway entrance and exit. They contain internal retro-reflectors that make them tremendously bright when observed with automobile headlights. The signs must be placed only a few feet off the ground, so that they are easily observable by drivers. Graffiti destroys their retro-reflectivity and, because they are placed so low, they are easily vandalized. Chemical paint removers must be used when the paint is very fresh, and these removers degrade the signs sufficiently that they may be used only a few times. Sand blasting cannot be used because it destroys the retro-reflection. The only other solution used now is to remove and replace these signs: an expensive proposition.

What is needed is a system to remove graffiti that is environmentally friendly, has very few expendables, is safe for the operator, produces minimum degradation of the surfaces and leaves very little mess at the work-site. At the same time, the cleaning method must be cost-effective. This requires an apparatus with very little set-up and take-down time and minimal labor effort. Ideally, the operator would not have to touch the surfaces at all.

Such a system could be used on highway signs, concrete blocks that surround highways, brick and marble buildings and other structures, stones, trees, and unpainted wooden structures. The system could also be used to remove unwanted paint from selected portions of furniture and other antiques.

With the advent of laser technology, lasers have been used to remove paint from objects such as aircraft or boat hulls. Laser technology systems for such applications have been disclosed that use different sensory devices to detect the amount of paint removed from a given surface. These techniques, while adequate for their intended purpose, preparing the surface of an aircraft or boat for subsequent repainting, do not disclose an adequate system for the restoration of highway signs or other surfaces covered by paint in localized areas.

Hand-held solid-state lasers have been used to clean marble statues and buildings and to remove grime and coal smoke. A Q-switched YAG laser for this use is available for purchase from Hedge Clemco in England. It uses hand-held fiber delivery system, which is awkward and undesirable where the height of the highway sign may be outside the reach of the operator or where more rapid, automated removal is needed.

Pulsed lasers, including Q-switched lasers, have been used to remove portions of integrated circuits in semiconductor devices (laser resistor trimming). Here, the part is usually moved under a fixed laser beam and one or a few blasts are used to remove the unwanted material. There is generally no scanning of the laser beam and there is no interactive control between the position of the unwanted materials and the direction of the laser beam. This application has allowed scientists to understand the process of "ablation" in which the unwanted material is removed so fast that the substrate does not heat up.

Thus, the need exists for a low-cost alternative to conventional graffiti-cleaning techniques in order to restore and extend the life of the highway signs and to remove graffiti easily from bridges, walls and highway abutments. The need also exists for a laser cleaning system that minimizes the damage to the reflective properties of the signs, thereby ensuring their continued service to motorists.

OBJECT AND SUMMARY OF THE INVENTION

It is an object of the present invention to provide a paint removal system for automated removal of undesired paint from a surface.

It is a further object of the present invention to provide an automated system for the automatic identification and removal of graffiti from the surface of a freeway sign.

It is yet another object of the present invention to minimize the loss of the reflective properties of the sign where the graffiti has been removed.

It is another object of the present invention to provide a mobile graffiti removal system that enables the user to remove graffiti from a highway sign or other with a minimal amount of effort.

The present invention relates to a mobile laser system for the removal of graffiti from a highway sign or other surface. A laser is used to ablate the surface of a highway sign to remove graffiti with a minimal effect on the underlying highway sign or other surface. In one aspect of the present invention, a laser beam is directed to radiate the surface of the highway sign from an acute angle of incidence to ablate graffiti painted on the surface. The graffiti is burned away from the surface with a minimal effect on the highway sign surface and reflective properties. Chemicals or polish may then be applied to further treat the surface. The detailed aspects of this laser system were developed following extensive research which is disclosed in an AHMCT Research Report entitled "Laser Removal of Graffiti", publisihed on Sep. 22, 1993.

The laser is connected in circuit with a computer configured by software to function as a laser control with optical feedback circuit. An optical sensor, preferably a pair of charged coupled device (CCD) video cameras, is positioned to view the highway sign and connected in circuit with the computer. A light source positioned to direct light upon objects within the field of view of the camera is connected in circuit with the computer and cooperates with the optical sensor. A target indicator cooperates with the optical sensor to function as a target acquisition device that identifies the intersection point of the laser with the highway sign.

A traveling crane equipped with a boom having a remote end is adapted to deliver a laser pulse from the remote end to the highway sign. The laser, the light source and optical sensor are preferably located at the base of the crane. The traveling crane is preferably adapted with a laser conduit to direct the laser emissions from the base of the crane to the free end of the boom. The invention is controlled by an operator at the base of the crane with a user interface that includes controls connected in circuit with the computer and controls for operating the boom of the crane to initially position the free end of the boom proximate to the highway sign.

The laser system is initially under the control of the operator who positions the boom proximate to the graffiti on the highway sign either by visually viewing the boom and sign within the operator's line of sight, or preferably by viewing the highway sign from a video monitor included in the user interface that displays the image viewed by the optical sensor.

Once the boom has been positioned, the operator frames a portion of the highway sign to be cleaned on the video display using the user interface. The computer is then actuated by the operator to automatically identify the graffiti within the selected area of the highway sign. The computer locates the graffiti and adjusts a laser scanner at the free end of the boom to direct a laser pulse at an acute angle of incidence to the surface of the sign to be cleaned. The computer pulses the laser to radiate the sign with laser pulses sufficient to remove a layer of graffiti paint. The computer then scans the surface with the optical sensor to compare the area scanned by the laser scanner with a preferred clean characteristic stored in the computer's memory. This procedure is repeated until the computer detects that the graffiti has been removed or the operator determines that the area has been sufficiently cleaned.

The optical sensor is then directed by the operator to the next region to be scanned or, in the case of the operator framing the entire sign, the laser operation is complete. By selectively cleaning only the portions of the sign covered with graffiti, the computer minimizes effects of the laser on the sign. The operator may then use a brush, preferably treated with a chemical cleaner or polish, at the free end of the boom to manually remove any residue remaining on the sign. The laser system will be described in greater detail as follows.

BRIEF DESCRIPTION OF THE DRAWING(S)

FIG. 3 is a perspective view of the present invention showing a laser beam path forming a target indicator point;

FIG. 4 is a perspective view of the present invention showing a laser pulse path;

FIG. 12 is a flow diagram of a safety check routine;

FIG. 13 is a flow diagram of an identify graffiti routine; and

DESCRIPTION OF THE PREFERRED EMBODIMENT

Figure 1:
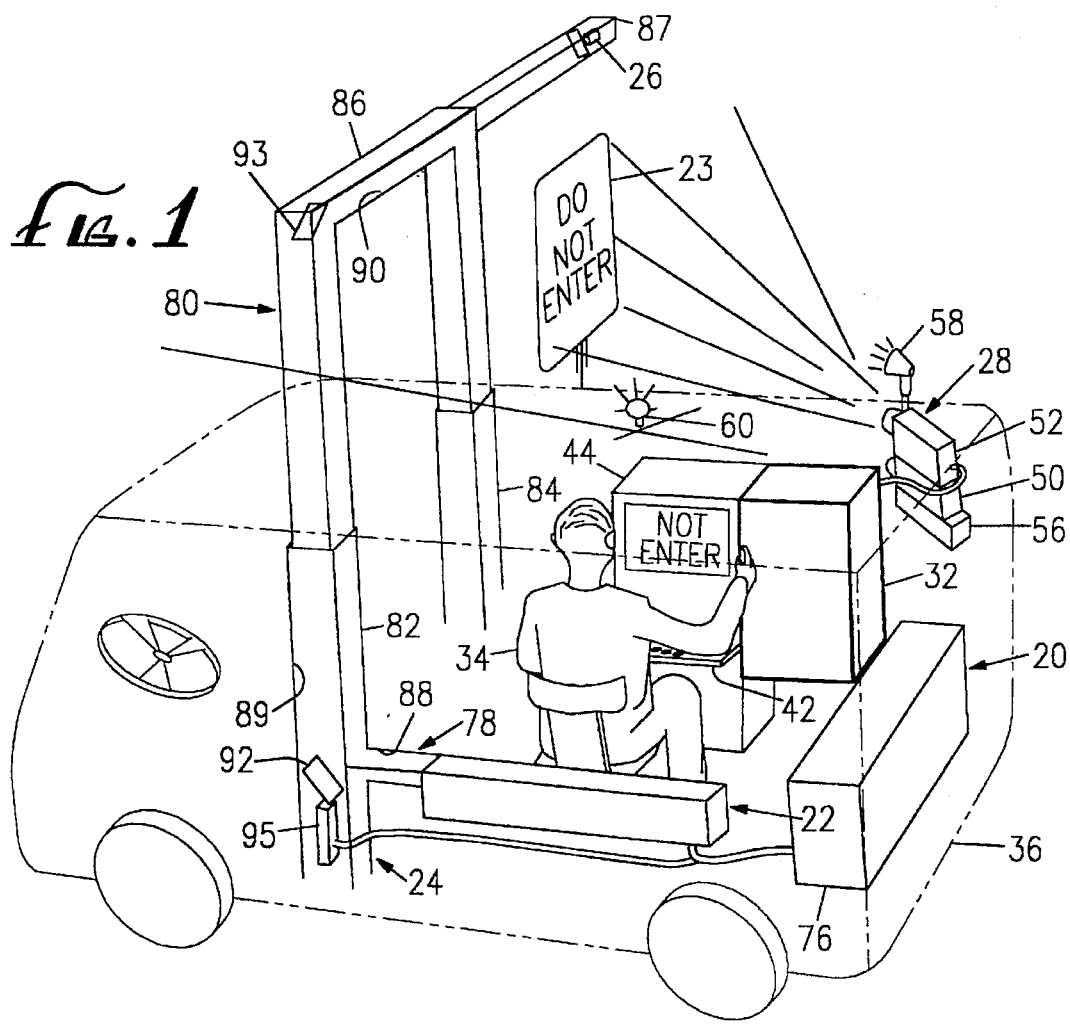
FIG. 1 is a perspective view of the laser apparatus of the present invention showing the crane in an operational position.
Figure 2:
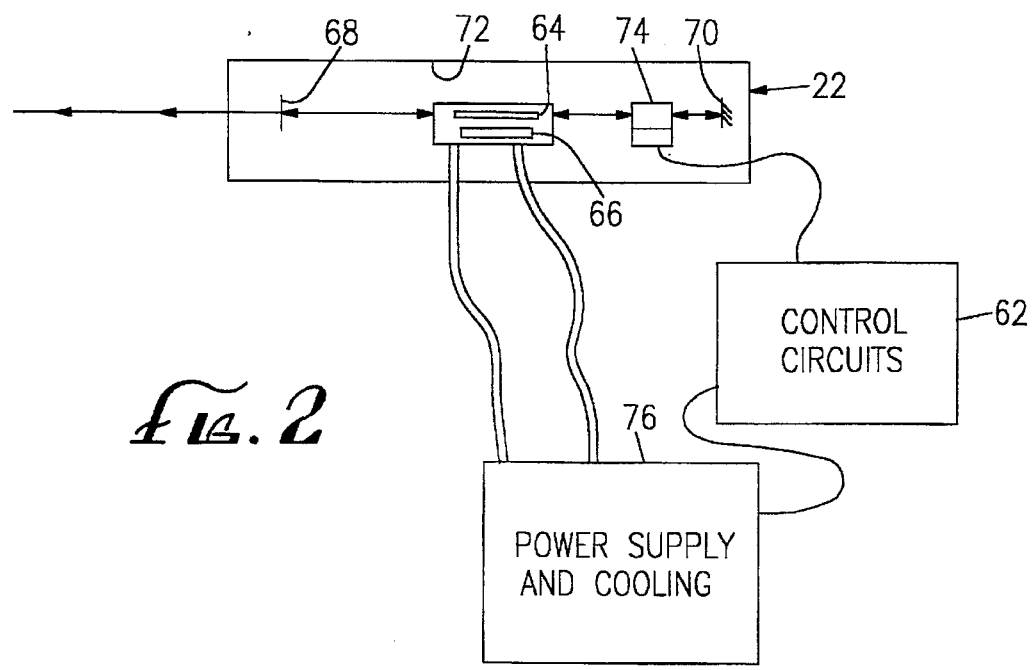
FIG. 2 is a block diagram of the laser of the present invention.

With reference to FIGS. 2, 3, 4 and 6, the laser system 20 for the removal of graffiti includes generally a laser 22 for ablating paint on the surface of a reflective highway sign 23, a laser scanner 26 configured to deliver a laser emission at any point with a selected area of the highway sign 23, an optical sensor 28 for detecting characteristics of the reflective highway sign and of the graffiti paint, and a computer 32 under the control of an operator 34 and configured by software to function as a laser control and optical feedback circuit.

Figure 8:
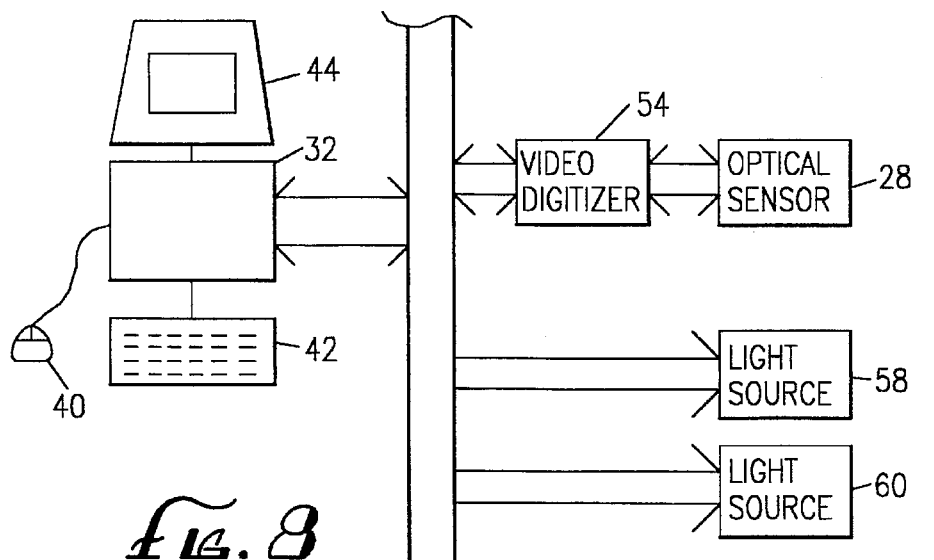
FIG. 8 is a block diagram showing the computer and computer peripherals connected to a computer bus.

With continued reference to FIGS. 2, 3, 4 and 6, the present invention is preferably mounted within the flatbed portion of a van 36. An operator user interface (FIG. 8) consists of a conventional computer terminal including a mouse or joystick 40, a keyboard 42 and a video monitor 44. A standard personal computer such as an IBM compatible type, having a central processing unit and memory, includes laser control and optical feedback software stored in memory that, when activated, functions as a laser control and optical feedback circuit for operating the laser system. The computer includes a conventional bus 46 interface in order to send and receive signals to and from the respective peripheral devices.

The laser system (FIGS. 2, 3, 4 and 6) is preferably configured for cleaning a sign located on the passenger side of the van 36 as most highway signs are viewed from the right side of the roadway. The optical sensor 28 is located at the rear end of the passenger side of the van for viewing the front of the highway sign 23 and includes a wide angle video camera 50 and a telephoto video camera 52 connected in circuit with the computer bus 46. A conventional video digitizer 54 connected between the camera and the computer bus 46 converts the camera video signals into a digital form recognizable by the computer 32. The cameras are mounted on a conventional motorized surveillance camera platform 56 connected in circuit with the computer bus. The platform, responsive to signals from the computer, is controlled by the operator using the user interface to position the highway sign within the field of view of the cameras. The platform is preferably mounted on the outside of the van to accommodate the field of view of the cameras. Advantageously, the computer selectively relays the signals representative of the respective camera's field of view to the computer monitor 44 for viewing by the operator to provide visual feedback to the operator adjusting the platform.

Acquisition of the highway sign using the video cameras as a means for digitally imaging the highway sign may be aided with illumination from conventional spotlights 58 and 60. A first light 58 is included positioned in-line with the field of view of the cameras to illuminate the retro-reflective properties of the highway sign. A second light 60 is located at a distance from the camera to illuminate the highway sign in a non-retro-reflecting manner to obtain "matte" reflection. Ambient illumination, if it is available, can be substituted for the second light 60. At different times either ambient light or the second light source 60 may be used to obtain "matte" reflection.

Connected to the computer bus and stored within the van in the preferred embodiment, the laser 22 for ablating the surface of the highway sign 23 is preferably a conventional Q-switched, Nd:YAG laser which lases in the near infrared wavelength. A conventional configuration for the laser, illustrated in the block diagram of FIG. 2, includes a conventional laser switch circuit 62 that connects with the computer via the bus (FIG. 8) and in response to signals therefrom, pulses the laser on and off. The lasing material is a Neodymium doped YAG crystal 64 that is excited by pulses of light from a flash lamp 66. The YAG crystal 64 is very accurately positioned between two carefully aligned mirrors 68 and 70, with one mirror 68 having transmissive as well as reflective properties, to create a resonant optical cavity 72 or lasing chamber. The flash lamp 66 is used to store energy in the YAG crystal. A Q-switch 74 is positioned within this cavity and connects in circuit to the laser switch circuit 62. The Q-switch operates under the control of the computer to produce very short, intense laser pulses by enhancing the storage and dumping of energy in and out, respectively, of the laser crystal 64. The Q-switch 74 in response to signals from the computer via the laser switch circuit, is operative to direct a laser pulse through the mirror 68 having the transmissive properties. The laser pulse is preferably an ultra short pulsed laser with a peak power of 10 Mega watts lasting about 10 billionths of a second. At this rate, the upper surface layer of graffiti is ablated while minimally affecting the underlying substrate.

A power and cooling unit 76 connects to the laser control circuit and the lasing chamber. The cooling system is a conventional closed water system that draws heat away from the laser crystal and flash lamp and dissipates the heat through a conventional radiator (not shown) contained within the power and cooling unit. All of these components are commercially available. A unit fit for this intended purpose is Model No. DCR-11 sold by Quanta-Ray Spectra-Physics of Mountain View, Calif., U.S.A.

A crane 80, having two vertical legs 82 and 84 mounted at opposite sides of the van proximate the driver's cab section, may be telescopically extended vertically above the roof of the van. The crane includes a boom 86, having a free end 87 telescopically extended horizontally to hang over the roof of the van. The crane legs and boom are extended to position the free end 87 of the boom near a highway sign 23 in an overlying relationship for confronting the front of the sign.

Aligned with the transmissive mirror 68 of the laser is a laser beam conduit 78 for transmitting a laser pulse 79 (FIG. 4) to the laser scanner. In the preferred embodiment, the conduit 75 is formed from carefully aligned optical mirrors 92-93 similar in design to a periscope. The laser conduit is formed within the hollow interior of the crane 80. The crane is movable between an operational position and a storage position. In the stored position (FIG. 6), the legs of the crane are telescopically withdrawn into the roof of the van and the boom is telescopically withdrawn to completely overlie the van roof. During operation, the legs 82 and 84 and boom are telescopically extended using conventional mechanical or hydraulic lifting mechanisms such as means for positioning the free end 87 of the boom.

The laser conduit has several segments 88–90 joined at right angles and includes mirrors 92 and 93 aligned at each orthogonal joint between the segments of the conduit for directing the laser pulse through the bends in the conduit.

In the preferred embodiment, the laser 22 is preferably aligned lengthwise along the length of the van. The first conduit 88 segment connects between the laser output at the transmissive mirror 68 and one of the vertical legs 82 of the crane. The first mirror 92, having reflective properties on the upper surface at the YAG laser wavelengths and transmissive properties from the lower surface at the HeNe wavelengths, is aligned to reflect the laser pulse from the first segment 88 through an orthogonal bend to the second segment 89 formed within the vertical leg 82 of the crane 80. The second segment 89 of the laser conduit joins the third segment 90 formed within the boom 86 of the crane. The second mirror 93 is positioned at the orthgonal joint between the second and third segments for transfering a laser pulse to the scanner 26 located at the free end 87 of the boom.

With reference to FIG. 3, a target indicator 24 of the preferred embodiment for identifying the intersection point of the laser beam with the highway sign 23 includes a HeNe laser 95, carefully aligned below the first mirror of the laser conduit to produce a visible, low-energy, continuous wave laser beam 96 (FIG. 3) coaxially along the same path of the Q-switched laser pulse. The visible laser beam 96 transmits through the underside of the first conduit mirror 92 and follows the path of the laser pulse through the vertical crane leg, the boom and the scanner to the highway sign. The visible laser 95 is actuated at power up and remains "on" during the operation of the laser system. The visible laser beam delivers a visible red dot 97 at the intersection point where the ablating laser path intersects an object. The red dot functions as a target indicator to identify where the invisible ablating laser pulse will contact the highway sign. The target indicator 24 cooperates with the optical sensors 28 to function as a target acquisition device.

Figure 5:
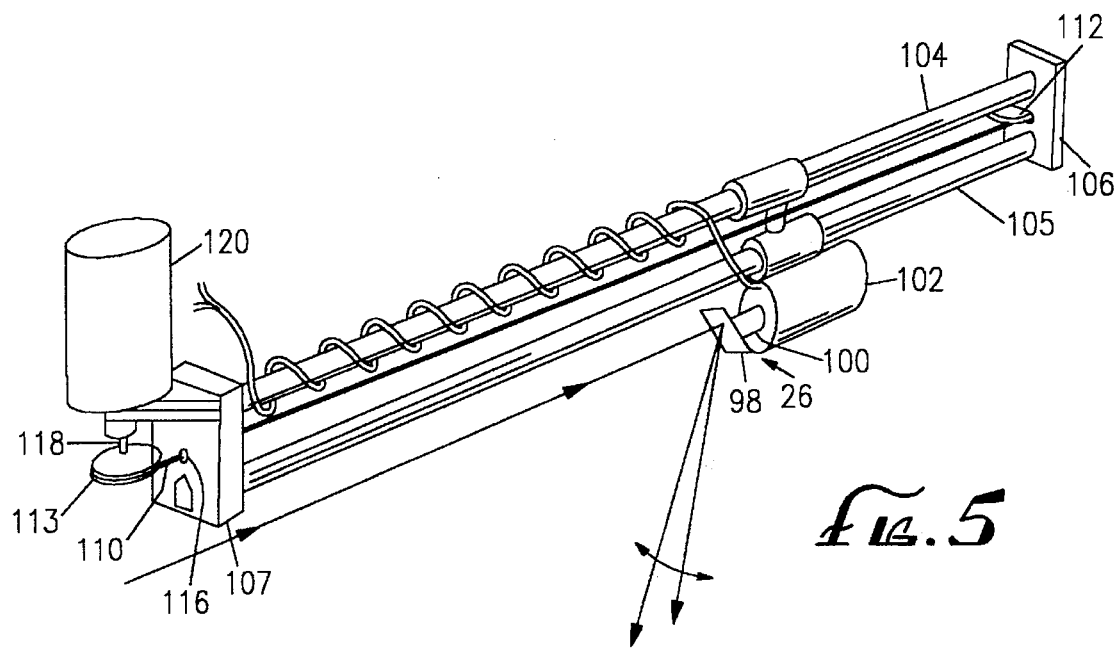
FIG. 5 is a perspective view of the laser scanner of the present invention
Figure 6:
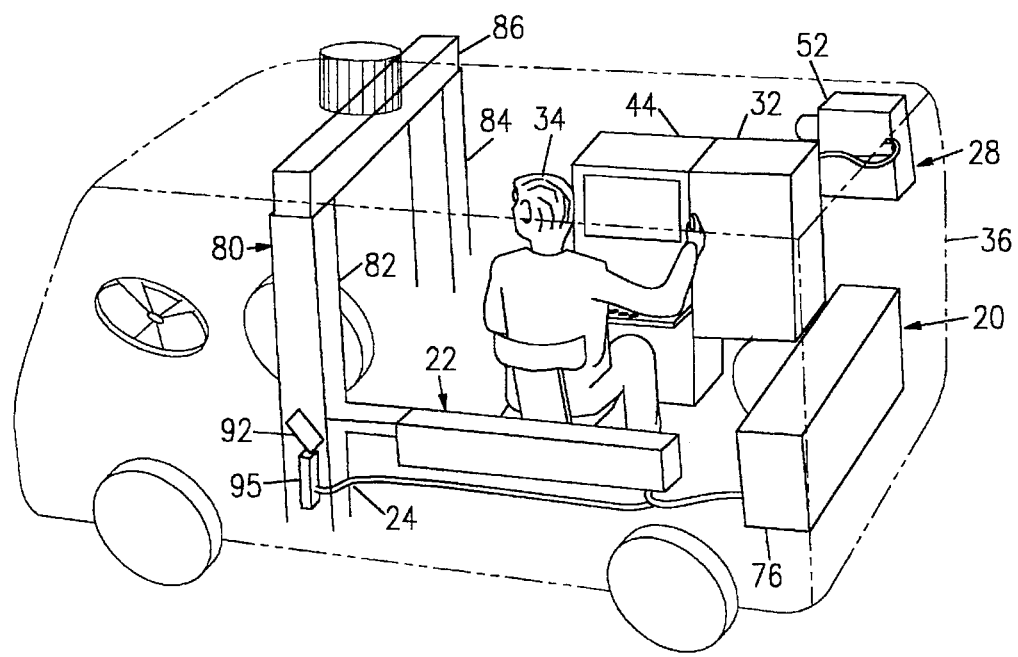
FIG. 6 is a perspective view of the present invention showing the crane in a stand position.

The scanner (FIG. 5), mounted at the free end of the boom, is connected to the computer 32 (FIG. 8) and responsive to signals therefrom to change the laser path to intersect the highway sign at any point along the face of the sign. In the preferred embodiment, the scanner 26 is a conventional angle scanner. The angle scanner includes a mirror 98 at the free end of the boom to intersect the laser path along the boom and reflect the laser energy in a direction orthogonal to the boom. The mirror is connected to the free end of an axle 100 on a galvanometer driven 102 positioned coaxially with the laser beam path at the free end of the boom. The conventional galvanometer driven 102 connects in circuit with the computer bus via a digital to analog converter (not shown) (FIG. 8) and incrementally rotates the mirror 98 on the axle 100 in response to signals from the computer to adjust the radial direction of laser beam from the boom. It will be recognized by those skilled in the art that the scanner operates on the principle of a galvanometer mirror. A device having a 3 msec response time suitable for this purpose is made by General Scanning Corporation, Watertown, Mass.; Model No. GT 325-DT.

The scanner motor 102 is movably coupled to a pair of parallel rails 104 and 105 secured by first and second end plates 106 and 107 at respective opposite ends of the rails and connects to a looped cable 110 which connects to a pair of pulleys at 112 and 113 opposite ends of the rails 104 and 105. The first pulley 112 is freely rotatable and connects to the first end plate 106. The cable projects through apertures 116 in the second end plate 107 and loops around the second pulley 113 which is connected to a vertically aligned axle 118 of a stepper motor 120. The stepper motor 120 is connected in circuit with the computer bus via a digital to analog converter (not shown) (FIG. 8) to function as a servo mechanism (FIG. 5) for laterally moving the scanner along the parallel rails 104 and 105 by incrementally rotating the cable 110 about the pulleys 112 and 113 in response to signals from the computer. Those skilled in the art will appreciate that this scanner configuration uses known principles applicable to x-y plotters.

OPERATION

Figure 9:
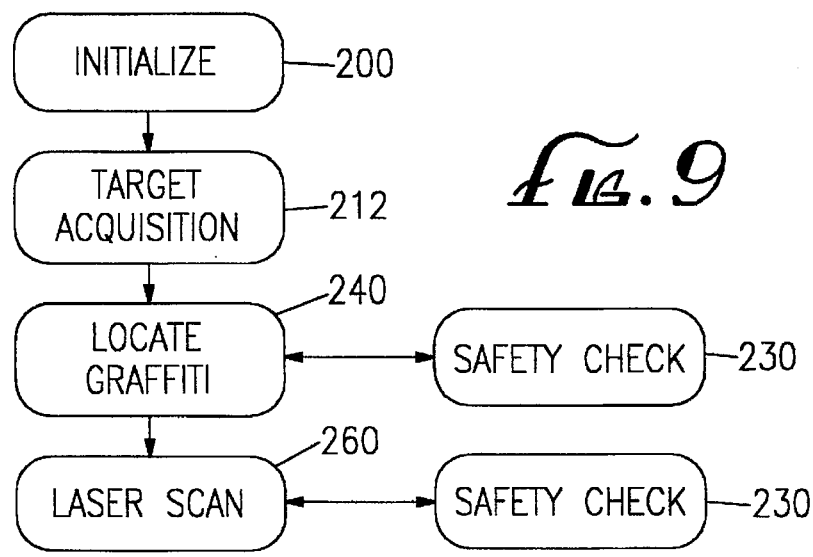
FIG. 9 is a flow diagram of the laser control with optical feedback software of the present invention.
Figure 10:
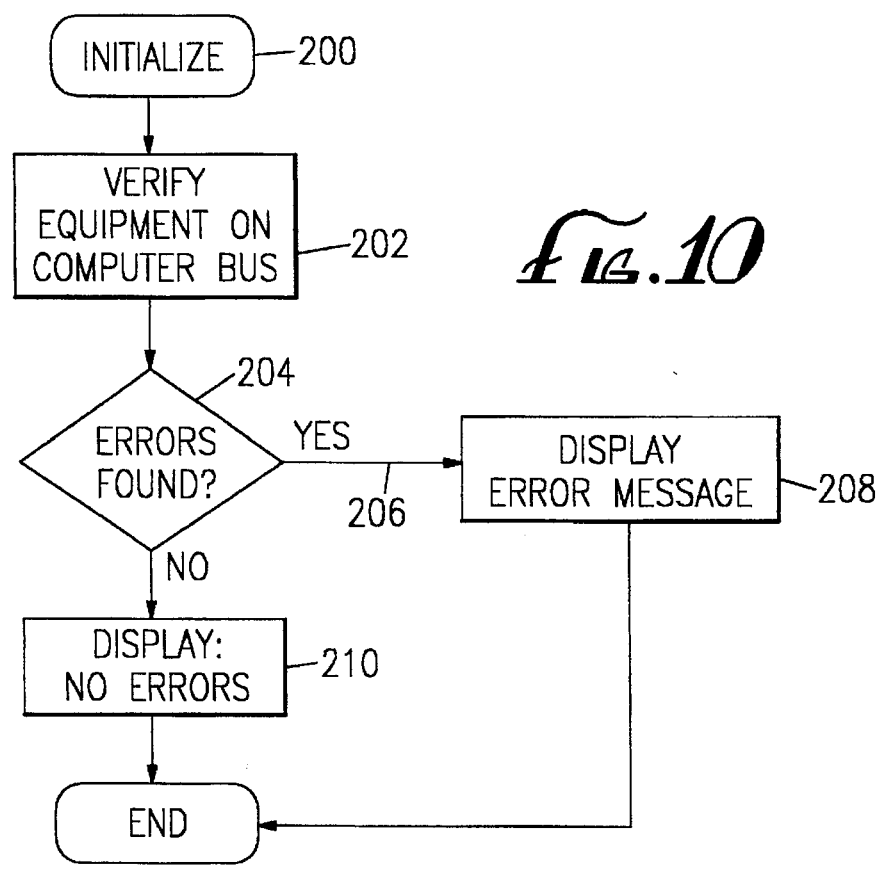
FIG. 10 is a flow diagram of an initiation routine.

The laser system 20 is intended for use on site at the location of the highway sign 23. The operator will typically park a converted utility van 36, housing the laser system alongside of the highway sign to be cleaned. Although a precise position is not necessary, the plane formed by the sign should generally intersect the passenger side of the van at the passenger window opposite the driver, thus allowing the driver to visually align the van 36 with the sign 23. Once the van has been aligned the operator parks the vehicle and proceeds to activate the laser system. Upon activation, the computer 32, under the control of software, initiates a conventional initialization and diagnostic routine 200 (FIGS. 9 and 10) to check the computer bus addresses 202 for any flags indicating a failure in the equipment.

If errors are found, at a conditional branch 204, the computer 32 identifies errors 206 and indicates to the operator 34 errors were detected by displaying 208 the appropriate error message on the computer terminal monitor 44 identifying the problems. If no errors are found at the conditional branch 204, the computer displays 210 to the operator that no errors were founded to prepare for scanning of the highway sign.

Figure 11:
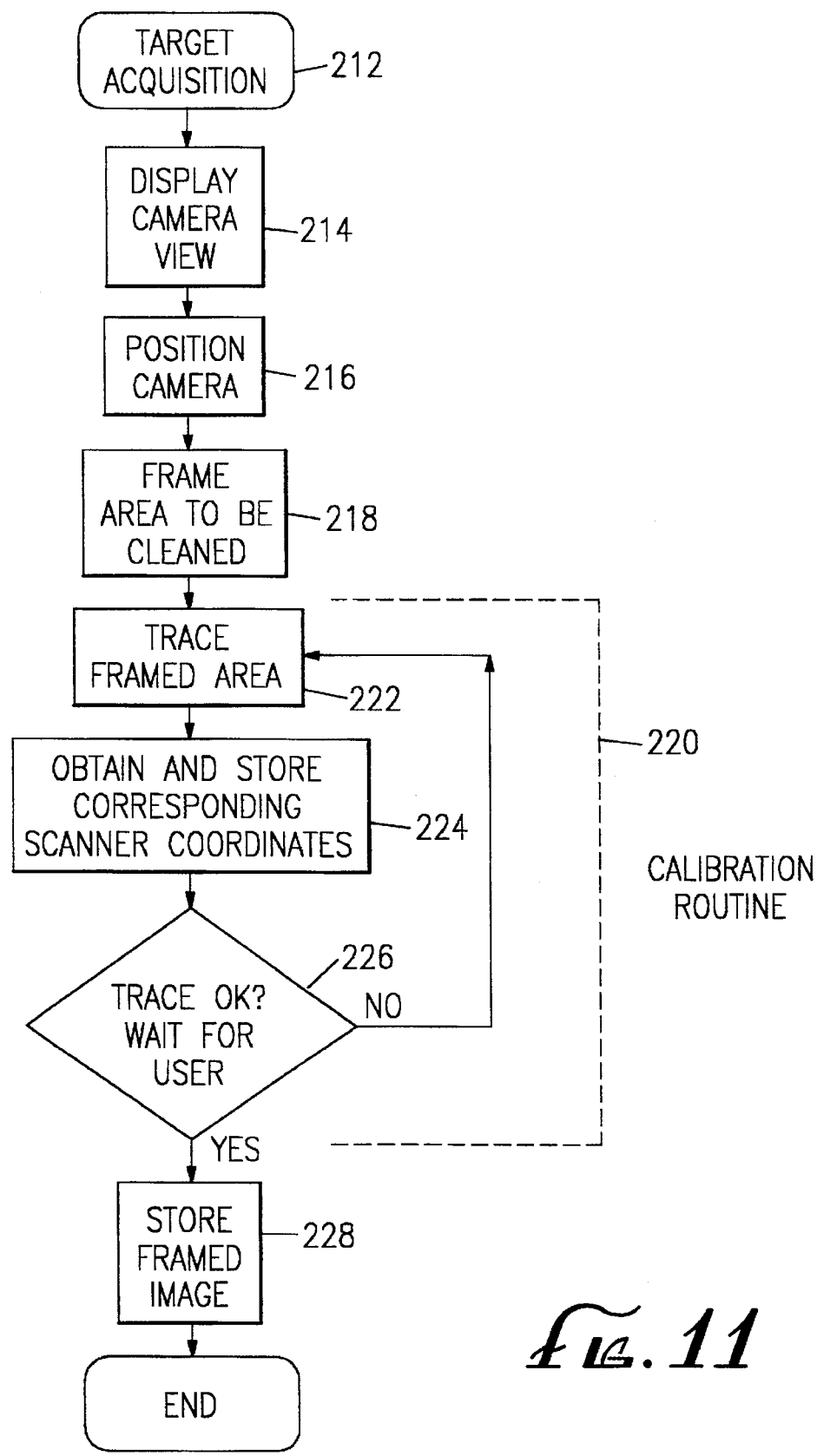
FIG. 11 is a flow diagram of a target acquisition routine.
Figure 14:
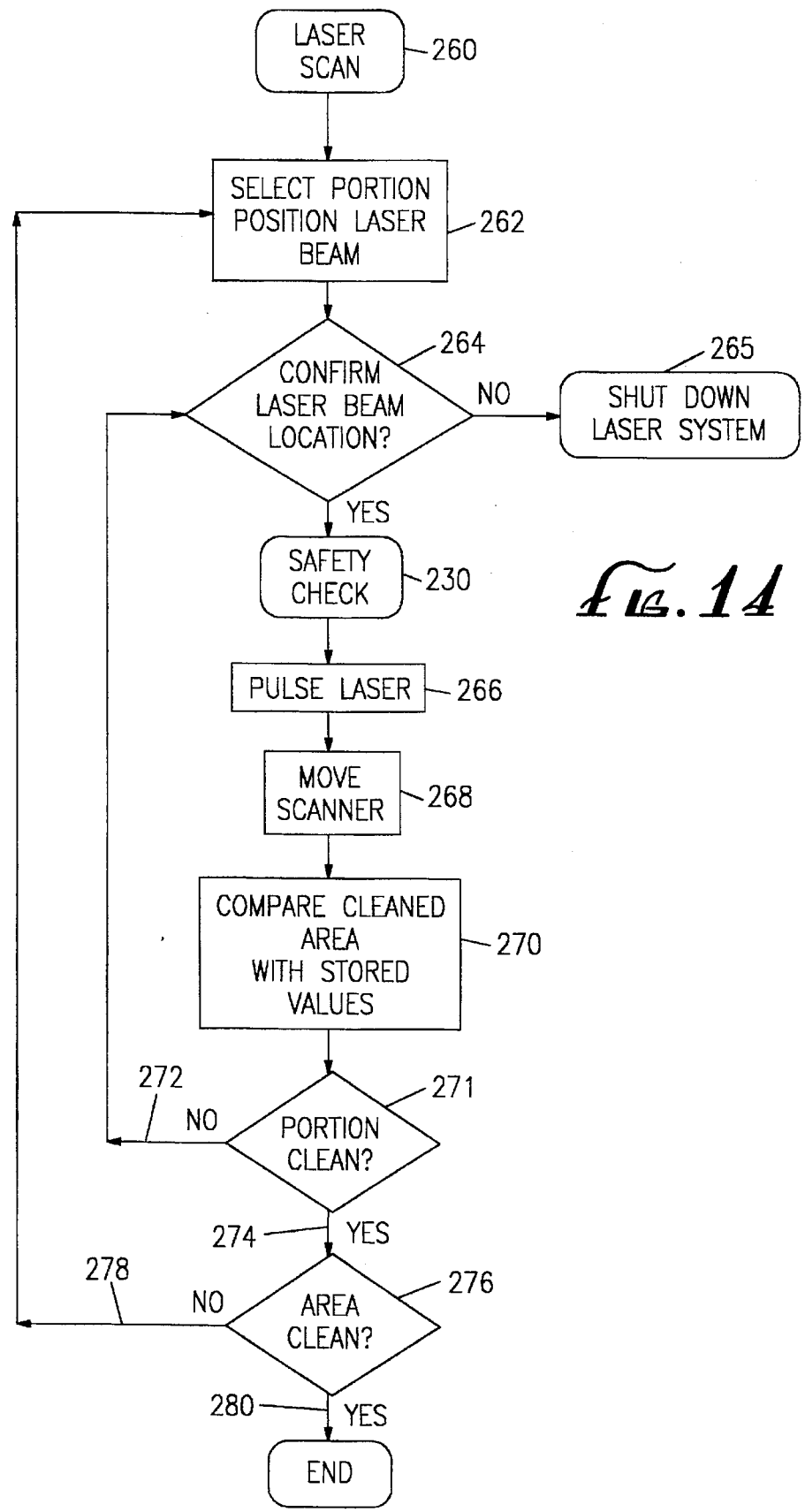
FIG. 14 is a flow diagram of a laser scan routine.

The computer then begins a target acquisition routine 212. In response to the operator, the computer displays 214 (FIG. 11) the image received from one the cameras. The operator uses the joystick or mouse to control the camera platform to rotate 216 the cameras to place the highway sign within the field of view of the camera. In the preferred embodiment, the crane 80 (FIG. 6) is then actuated by the operator 34, raising the legs and extending the boom, to position the laser scanner 26 in a confronting overlying position with the face of the highway sign (FIG. 1). Once the scanner has initially been positioned the operator may view images of the sign without the on-axis light source 58, to check the ambient lighting. If additional lighting is needed, the off-axis, supplemental light source 60 is manually positioned by the operator to illuminate the highway sign. After the lighting has been checked the operator then, viewing the sign from the monitor, frames 218 (FIG. 11) the portion of the highway sign to be cleaned with the mouse or joystick using conventional point and click editing algorithms such as provided by Microsoft Windows®. Using the red dot 97 (FIG. 3) to indicate the intersection point of the laser pulse path with the highway sign, the coordinates of the framed portion of the highway sign displayed on the monitor are calibrated 220 (FIG. 11) by the computer with the scanner. The red dot 97 when displayed within the field of view of the camera is visually recognizable by the computer. The computer uses the position of the red dot as a reference to perform conventional feedback algorithms, such as hi-low or fuzzy logic, to signal the laser scanner to trace 222 the red dot along the border of the framed area. The corresponding laser scanner coordinates are stored 224 by the computer. Once the laser scanner and cameras have been calibrated, the operator is prompted 226 to ensure the area has been correctly identified. If the operator verifies the computer has correctly identified the framed area, the digital image of the framed area is stored 228, otherwise the computer repeats the calibration steps 220.

Once the image is stored 228, the computer continuously uses the digital image to periodically perform a safety routine 230 (FIG. 12) that compares 232 the stored image with a live image to check for image changes 233 to ensure no objects or people obstruct the laser path. The safety routine 230 also continuously checks 234 for the presence of the red dot in the live image. Upon detecting the absence of the red dot or a change in the live image with stored digital image, the computer generates 236 an error message on the monitor 237 and shuts down 238 the laser system. The operator then can manually identify the problem, correct any obstruction and restart the system.

Upon completing the target acquisition routine 212, the computer performs a locate graffiti routine 240 using the video cameras. The locate graffiti routine uses conventional optical recognition algorithms using stored values relating to the reflective characteristics of the retro-reflective highway surface and the graffiti. In the preferred embodiment (FIG. 13), the computer compares 242 each pixel of the bit-mapped digital image of the area framed by the operator with the stored reflective characteristics and checks for the presence of graffiti 243. The computer then graphically highlights 244 the regions containing graffiti on the monitor and prompts 246 the operator to verify 248 or modify 250 the computer's identification of the graffiti. If needed, the operator can add or delete highlighted portions using the mouse or joystick to move a cursor on the monitor using the conventional point and click editing algorithms 251 to add to or delete from the highlighted areas. If the computer finds an area having unknown characteristics, the computer may also prompt 252 the operator to identify the unknown area, such as a hole in the sign. The operator may view and assess the unknown area to determine if the point contains graffiti or holes. In one preferred embodiment, the computer stores and displays 253 a modifiable list of unknown area types. The operator then selects 254 a label from the list to identify the region to the computer, or adds a new label to identify this characteristic. Unless the unknown area is labeled as graffiti, the computer does not highlight the unknown area.

Satisfied with the highlighted display of graffiti, the operator then signals the computer 248 to begin a laser scan routine 260 that automatically scans the graffiti-covered portions with the ablating laser. The laser scan routine 260 positions the laser beam 262 at a point convenient to begin scanning of the graffiti, such as the upper left point in the highlighted regions. The computer confirms 264 the location of the laser by using the cameras to locate the position of the red dot. If the calibration is off, the computer shuts down the system 265. Upon confirming the calibration, the safety check loop 230 is initiated. The computer then signals 266 the laser switch circuit to begin pulsing the Q-switched laser while also signaling 268 the scanner to scan the laser intersection point across a computer-selected portion of the highlighted graffiti. The computer, upon completing a scan, checks the image of the area scanned using the telephoto camera and determines 270 whether the area has been cleaned using conventional optical recognition algorithms such as comparing the image with the non-highlighted regions of the prior scanned image or with stored predetermined values. If the computer comparison result 271 indicates graffiti remains 272, then the scan is repeated.

Once the computer has determined that the scanned portion is clean 274, it checks to determine if all highighted portions have been scanned 276. If not, it moves on to the next computer-selected portion 278 and performs the same scan routine. This routine is repeated until the entire highlighted area has been cleaned of graffiti 280.

In the preferred embodiment, the computer-selected portions are rows or columns of the graffiti-covered highlighted area. The width of each column or row corresponds to the width of the laser pulse, about 3 $cm^2$. In the preferred embodiment, the laser pulse width must correspond to the resolution width of the pixels in the telephoto camera.

The laser is pulsed at a preferred rate of 50 pulses per second to handle the program routine timing. The scanner motor has a has a preferred response rate of about 3 milli-seconds. The laser pulse rate provides ample time between pulses for the computer to complete movement of the scanner 268 and execute the safety routine 230 before each subsequent laser pulse is transmitted 266.

Figure 7:
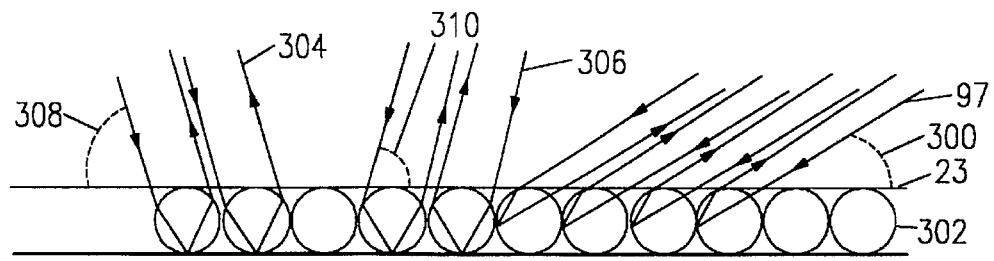
FIG. 7 is cutaway side view of the highway sign of FIG. 4.

Even using a discrete 10 billionths of a second pulse rate to minimize the laser effects on the sign, the laser will reduce the retro-reflective properties of the highway sign 24 formed from beads of glass 302 when viewed at the angle of impact 300 (FIG. 7). Therefore, the angle of impact must not be within range of views 304 and 306 visible by motorists. The boom is preferably adjusted to confront the highway sign from an overlying position, forming an acute angle 300 of no more than 45° between the laser beam and the plane of the highway sign. This position ensures that the angle of impact is outside the angles 308 and 310 viewed by motorists.

Upon completion of the laser cleaning operation, the operator 34 may then use a brush, optionally treated with a chemical solvent or polish, to clean the surface of any remaining graffiti and polish the surface to further restore the retro-reflective properties. Commercially available products fit for this purpose are Bon Ami™ or So-Safe™. Following cleaning with a protective spray applied to the sign, a spray such as Armour All™ may be used to resolve the reflective properties. Also, a spray coating to protect against further vandalism could be applied.

In an alternatively preferred embodiment, the laser scanner may comprise a conventional position scanner to accommodate a fiber optic conduit. The fiber optic conduit eliminates the need for the precisely aligned mirrors and could accommodate alternative boom designs with increased mobility such as a modified "cherry picker", which is used to hold a person at the free-end of the boom. The computer would control the laser and scanner in a similar manner. Those skilled in the art will also appreciate that the laser control and optical feedback circuit could also be configured on a solid state integrated circuit, such as an Application Specific Integrated Circuit (ASIC).

It will be appreciated that the present invention may also be used on surfaces such as cement or wood to remove graffiti paint. However, when used on these surfaces, the operator would use the joystick or mouse to highlight the graffiti areas. The computer would then locate the coordinates of the area highlighted using the target acquisition device in the same steps following framing of an area. Then pulses from the laser while scanning the region ablate the graffiti from the surface. Upon completing a scan, the operator would then again visually inspect the region using the video monitor and highlight additional portions if further scanning by the laser system is required.

While a particular form of the invention has been illustrated and described, it will be apparent that various modifications can be made without departing from the spirit and scope of the invention. Accordingly, it is not intended that the invention be limited, except by the claims appended herein.

What is claimed is:

1. A mobile laser apparatus for the removal of graffiti from a highway sign comprising:

an ablating laser being energized such that ablating laser emissions are generated to ablate the surface of said highway sign;

an optical sensor movably positioned to view said highway sign to generate optical sensor signals representative of the surface of said highway sign;

a laser scanner movably positioned proximate to said highway sign to direct said ablating laser emissions at the surface of said highway sign;

conduit means for transmitting said ablating laser emissions from said ablating laser to said laser scanner;

a target indicator in alignment with said laser scanner to identify an intersection point of said ablating laser emissions with said highway sign;

a control and feedback circuit connected in circuit with said ablating laser, optical sensor and laser scanner such that said control and feedback circuit, in response to said optical sensor signals, controls said ablating laser and said laser scanner to direct laser emissions at graffiti on the surface of the highway sign causing ablation of said graffiti;

said target indicator includes a visible laser being mounted to deliver visible laser emissions coaxial with said ablating laser emissions from said laser scanner to produce a visible reference point on said highway sign indicating said intersection point;

said optical sensor in response to sensing said visual laser emissions, generates a target signal representative of the location of said intersection point, and said control and feedback circuit, in response to said target signal, identifies the position of said intersection point on the surface of said highway sign;

said feedback and control circuit includes safety means for shutting down said laser apparatus in response to an unsafe condition; and said safety means includes a memory for storing a reference image and shuts down said ablating laser in response to detecting differences between said optical sensor signal and said reference image such that an object moving in front of the highway sign may be detected.

2. A mobile laser apparatus for the removal of graffiti from a highway sign comprising:

an ablating laser being energized such that ablating laser emissions are generated to ablate the surface of said highway sign;

an optical sensor movably positioned to view said highway sign to generate optical sensor signals representative of the surface of said highway sign;

a laser scanner movably positioned proximate to said highway sign to direct said ablating laser emissions at the surface of said highway sign;

conduit means for transmitting said ablating laser emissions from said ablating laser to said laser scanner;

a target indicator in alignment with said laser scanner to identify an intersection point of said ablating laser emissions with said highway sign;

a control and feedback circuit connected in circuit with said ablating laser, optical sensor and laser scanner such that said control and feedback circuit, in response to said optical sensor signals, controls said ablating laser and said laser scanner to direct laser emissions at graffiti on the surface of the highway sign causing ablation of said graffiti;

said target indicator includes a visible laser being mounted to deliver visible laser emissions coaxial with said ablating laser emissions from said laser scanner to produce a visible reference point on said highway sign indicating said intersection point;

said optical sensor in response to sensing said visual laser emissions, generates a target signal representative of the location of said intersection point, and said control and feedback circuit, in response to said target signal, identifies the position of said intersection point on the surface of said highway sign; and said control and feedback circuit includes reference image means for retrieving and storing an optical sensor signal representative of a portion of said highway sign to be scanned by said laser scanner.

3. The laser apparatus of claim 2 wherein said control and feedback circuit includes means for recognizing graffiti within said reference image.

4. The laser apparatus of claim 3 wherein said control and feedback circuit, upon recognizing graffiti, signals said laser scanner to direct said laser emissions at said graffiti and signals said ablating laser to generate ablating laser emissions to ablate said graffiti such that scanning of the graffiti within said reference image thereby removes graffiti from the surface of said highway sign.

5. The laser apparatus of claim 4 wherein said scanner is positioned to direct laser emissions at an acute angle no more than 45 degrees to a plane defined by the surface of said highway sign such that the laser grazes the surface of said highway sign.

6. The laser apparatus of claim 2 wherein said control and feedback circuit includes calibration means for adjusting laser scanner coordinates to correspond with coordinates of said portion of said highway sign such that said control and feedback circuit can signal said laser scanner to move said intersection point to any coordinate within said portion.

7. A mobile laser apparatus for the removal of paint from a surface comprising:

an ablating laser to generate ablating laser emissions having a predetermined pulse and wavelength to ablate paint from a surface.

a laser scanner movably positioned proximate to said surface to direct said ablating laser emissions at least one intersection point on said surface;

means for transmitting said laser emissions from said ablating laser to said laser scanner;

an optical sensor movably positioned to view said surface to generate optical sensor signals representative of said surface;

a target indicator in alignment with said laser scanner to identify said intersection point between said laser emissions and said surface; and a control and feedback circuit connected in circuit to said ablating laser, said laser scanner and said optical sensor and including a user interface having a display and an editing device, means for calibrating said laser scanner to scan paint on said surface and means for controlling said ablating laser and said laser scanner to ablate said paint on said surface such that said control and feedback circuit in response to said optical sensor signals from said optical sensor displays an image representative of said surface on said display to thereby allow a user operating said editing device to manually identify said paint on said surface whereby said calibrating means and said control means cooperate to position said laser scanner to automatically remove paint from said surface.

8. The mobile laser apparatus of claim 7 wherein said ablating laser is a ablating laser having generally a 10 billionths of a second pulse rate.

9. The mobile laser apparatus of claim 7 wherein said mobile laser apparatus includes:

a vehicle housing said ablating laser, laser scanner, said optical sensor and said control and feedback circuit to provide mobility such that an operator drives said vehicle to a remote surface; and said vehicle includes a crane having an extendable boom connected to said laser scanner at a free end such that, upon positioning said Vehicle alongside said remote surface, said extendable boom positions said laser scanner proximate to said surface.

10. A mobile laser apparatus for the removal of paint from a sign comprising:

an ablating laser;

an optical sensor movably positioned to view said sign;

a laser scanner movably positioned proximate to said sign;

a laser transmission conduit connected between said ablating laser and said laser scanner;

a target indicator aligned with said laser scanner;

said optical sensor connected in spaced apart relation with said laser scanner and independently movable relative to said laser scanner; and a control and feedback circuit connected to said ablating laser, optical sensor and laser scanner.

* * * * *